United States Patent
Tsai

(10) Patent No.: US 6,226,107 B1
(45) Date of Patent: May 1, 2001

(54) MULTI-RESOLUTION SCANNERS

(75) Inventor: Jenn-Tsair Tsai, Taipei Hsien (TW)

(73) Assignee: Mustek System Inc. (TW)

( * ) Notice: Subject to any disclaimer, the term of this patent is extended or adjusted under 35 U.S.C. 154(b) by 0 days.

(21) Appl. No.: 09/115,833

(22) Filed: Jul. 15, 1998

(51) Int. Cl.$^7$ ........................................ H04N 1/04
(52) U.S. Cl. ..................... 358/496; 358/475; 358/487; 358/474
(58) Field of Search ........................... 358/401, 488, 358/496, 498, 487, 474, 489, 509, 506, 475, 505, 494

(56) References Cited

U.S. PATENT DOCUMENTS

| | | | |
|---|---|---|---|
| 4,288,821 | * 9/1981 | Lavallee et al. | 358/293 |
| 4,575,769 | * 3/1986 | Arnoldi et al. | 358/285 |
| 5,687,010 | * 11/1997 | Van Tilborg et al. | 358/496 |
| 5,705,805 | * 1/1998 | Han et al. | 358/474 |
| 5,710,425 | * 1/1998 | McConica et al. | 358/487 |
| 5,818,062 | * 10/1998 | Baba et al. | 358/488 |
| 5,818,611 | * 10/1998 | Shih | 358/487 |
| 5,907,411 | * 5/1999 | Han et al. | 358/487 |
| 5,956,152 | * 9/1999 | Yamada et al. | 358/412 |

* cited by examiner

Primary Examiner—Cheukfan Lee

(57) ABSTRACT

The invention discloses a multi-resolution scanner that scans documents without moving scanner components. Single light source and lenses with different resolutions are combined for scanning the transparent and the reflective documents that reduces the scanner sizes and cost. Lights from the transparent documents follow different optical path with the reflective documents' to project to the charged-coupled device. The transparent documents and the reflective documents respectively use a lens with different resolution for achieving the documents' requirements.

7 Claims, 2 Drawing Sheets

MULTI-RESOLUTION SCANNERS

BACKGROUND OF THE INVENTION

1. Field of the Invention

The present invention relates to scanners, and more particularly, to a multi-resolution scanner for scanning reflective and transparent documents without moving any scanner component.

2. Description of the Prior Art

Science progresses have significantly brought many scanners to be produced for achieving different kinds of requirements. Scanners are often requested to be standard equipment for building in a computer case.

Conventionally, the build-in scanners are usually constrained by usable spaces, and the scanning range is serious influenced because the sizes of the mechanical and optical components can not be effective reduced. Furthermore, traditional build-in scanners can only scan reflective documents, such as papers, photos, and business cards because the light source is usually allocated at the scanned sides of the scanned documents. Those transparent documents such as projection slides or lantern slides can not be scanned directly in the conventional build-in scanners, and additional peripheral scanning devices are needed for scanning such documents. In addition, the scanning resolution used for the reflective documents is insufficient for the transparent documents. What is clearly needed is a scanner being capable of scanning both the reflective and the transparent documents under a circumstance of larger scanning range.

SUMMARY OF THE INVENTION

The object of the invention is to provide a multi-resolution scanner for scanning the transparent and the reflective documents without moving the scanner components.

Accordingly, the invention discloses a multi-resolution scanner for scanning the transparent and the reflective documents by combining a single light source and lenses with different resolutions. Lights from the transparent documents follow different optical paths from the optical path that light from the reflective documents follow, but to project to the same charged-coupled device. The scanner uses a lens for transparent documents and the reflective documents respectively with different resolutions for achieving the documents' requirements.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
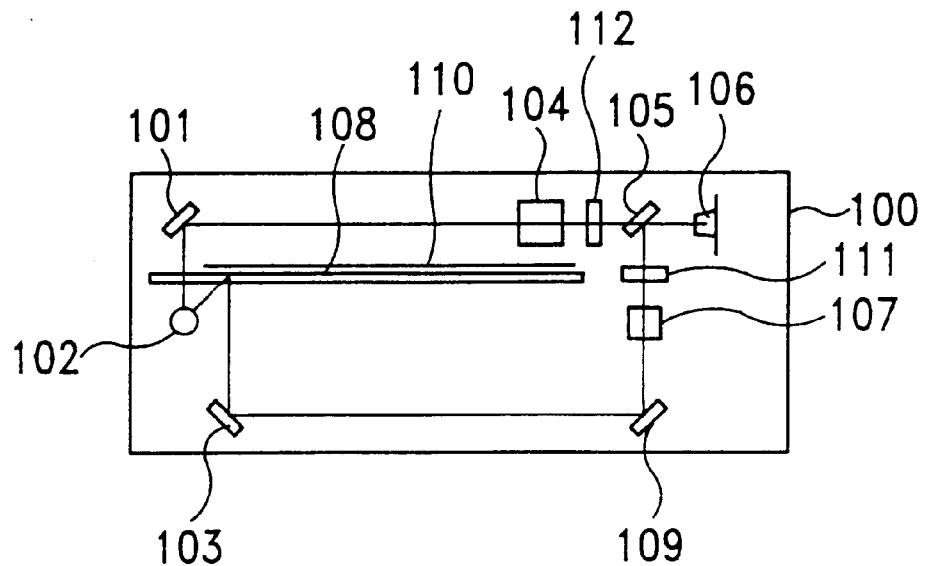
FIG. 1A is a cross-sectional view illustrative of the structure diagram of the first embodiment.
Figure 1B:
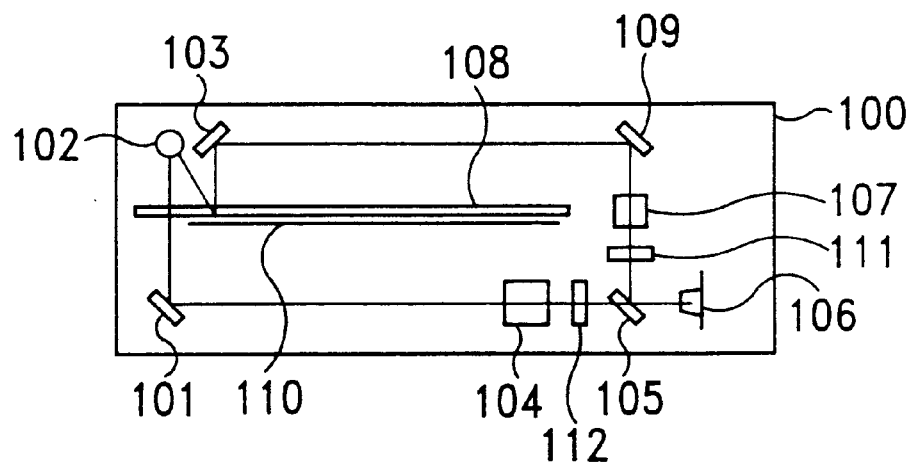
FIG. 1B is another arrangement of the first embodiment.

FIG. 1A depicts a cross section representative of the schematic diagram of the first embodiment. FIG. 1B shows another arrangement of the first embodiment by turning all the scanner components upside down.

When a scanned document 108 is a transparent document, light illuminated from a light source 102 are directed to the scanned document 108 and then reflected to a mirror 101. The reflected lights from the mirror 101 then enters a lens 104 and a beam splitter 105, and finally arrives at a CCD (Charge-Coupled Device) 106.

The light illuminated from the light source 102 is reflected by the scanned document 108, and then directed to a mirror 103 a mirror and 109 when the scanned document 108 is a reflective document. Those lights from the mirror 109 enter a lens 107 and the beam splitter 105 to the CCD 106. Obviously, optical paths of scanning the transparent and reflective documents are different. A cover 110 presses the scanned document 108 for conveniently performing the scanning operations.

By completely applying the characteristic of the beam splitter 105 that receives lights from two directions, all the lights from the different optical paths can arrive the CCD (Charged-Coupled Device) 106. Therefore, all the scanner components do not need to be moved whether the material of the scanned document 108 is transparent or reflective. Furthermore, the resolution of the lens 104 must be higher than the lens 107 because the transparent documents usually need higher resolution to obtain satisfactory scanning images as compared to the reflective documents.

In addition, masks can be applied to shield lights from one direction of the beam splitter 105 when the light from other direction of the beam splitter 105 that come from the scanned document 108. For instance, a mask 111 located between the lens 107 and the beam splitter 105 can prevent the light from entering the lens 107 to the beam splitter 105 when the transparent document is scanned. In other words, a mask 112 located between the lens 104 and the beam splitter 105 can block the light from entering the lens 104 to the beam splitter 105 when scanning a reflective document. Please note that the mask 112 can be eliminated because the light should be reflected by the reflective documents.

Figure 2A:
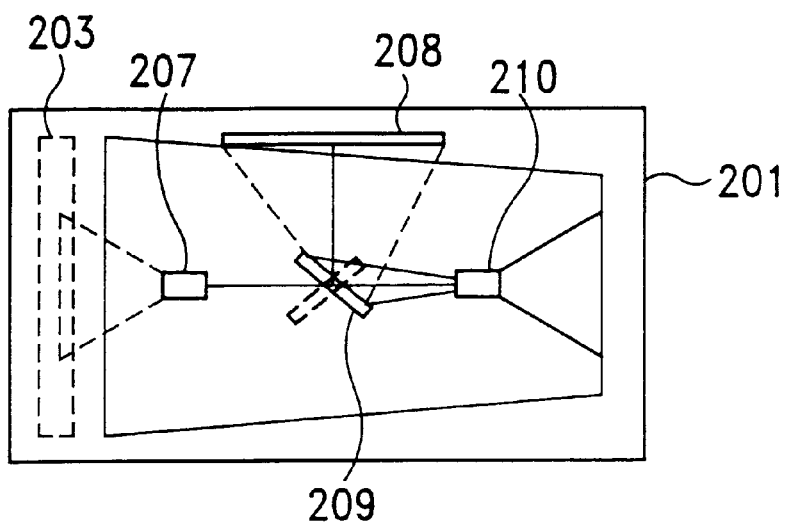
FIG. 2A depicts a top view illustrative of the structure diagram of the second embodiment.
Figure 2B:
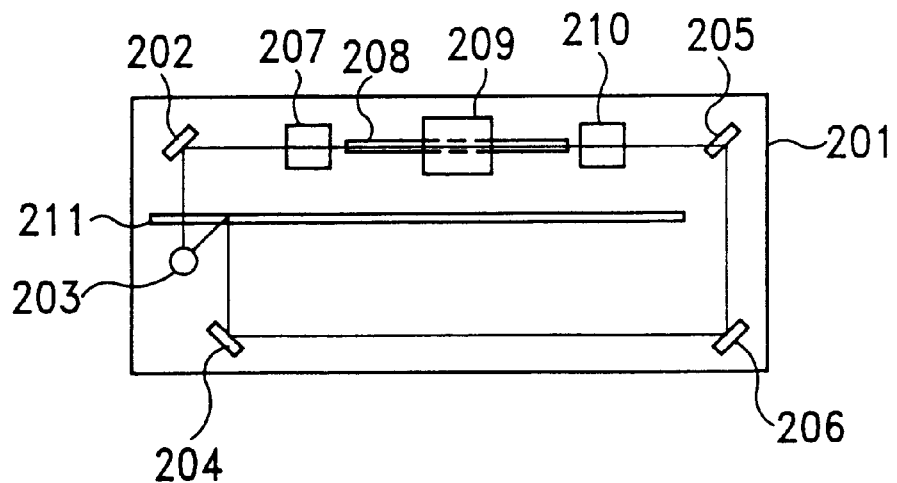
FIG. 2B depicts a cross-sectional view representative of the structure diagram of the second embodiment.

FIGS. 2A and 2B respectively show a top view and a cross-sectional view illustrative of the second embodiment. The scanned document 211 can be put inside a tray, or fed into the scanner 201 by rollers. In comparison with the first embodiment, the second embodiment applies a rotational mirror 209 instead of the beam splitter 105 to guide the lights to a CCD 208.

When the scanned document 211 is a reflective document, the light is projected to the scanned document 211 will be guided to a mirror 204 and a mirror 206, and then reflected by the mirror 205 to enter the lens 210. The received lights are then directed by the rotational mirror 209 (rotational angle is 45°) to the CCD 208. When the scanned document 211 is a transparent document, the lights illuminated from the light source 203 will penetrate the scanned document 211 to the mirror 202, and then be directed to penetrate the lens 207. The penetrated lights are then guided to the rotational mirror 209 (rotational angle is 135°), and finally project to the CCD 208.

In comparison with the first embodiment, the reflective documents also follow a different optical path with the transparent documents' in the second embodiment, but only the rotational mirror 209 need to be rotated according to the materials of the scanned document 211. In addition, there is no further constraint to the dynamics' transference of the scanner components. Dynamics' transference used in conventional scanners, such as applying gear sets, racks, transmission axes, or wires are adapted to transfer dynamics from motors. Otherwise, the light source and the tray can be respectively replaced by lamps and cassette, and furthermore, the multi-resolution scanner can be built-in a computer case by using a housing device.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A multi-resolution scanner for scanning transparent and reflective documents, comprising:

feeding means for feeding a scanned document into said multi-resolution scanner;

image generating means for generating image information of said scanned document, wherein an optical path for scanning the transparent document is different from the optical path of scanning the reflective document; and wherein said image generating means comprises only one light source for illuminating light to project to the scanned document;

reflecting means comprising a beam splitter and a mask for reflecting said light from the scanned document and image scanning means for generating said image information; and transferring means for controlling operations of passing the scanned document through said image generating means to generate said image information.

2. The multi-resolution scanner according to claim 1, wherein said feeding means comprises a plurality of rollers or a tray.

3. The multi-resolution scanner according to claim 1, wherein said reflecting means comprises a plurality of mirrors.

4. The multi-resolution scanner according to claim 1, wherein said image scanning means comprises lenses with different resolutions.

5. The multi-resolution scanner according to claim 1, wherein said resolution of said lens that scans said transparent document is higher than said resolution of said lens that scans said reflective document.

6. The multi-resolution scanner according to claim 1, wherein said image scanning means comprises a charge-coupled device.

7. The multi-resolution scanner according to claim 1, said multi-resolution scanner further comprises a housing device for building-in a computer case.

* * * * *